United States Patent
Keegan et al.

(10) Patent No.: US 10,291,878 B2
(45) Date of Patent: May 14, 2019

(54) SYSTEM AND METHOD FOR OPTICAL AND LASER-BASED COUNTER INTELLIGENCE, SURVEILLANCE, AND RECONNAISSANCE

(71) Applicant: Selex Galileo Inc., Arlington, VA (US)

(72) Inventors: Matthew Keegan, Arlington, VA (US); Mark McElhinney, Tucson, AZ (US); Jean Michel Maillard, Tucson, AZ (US)

(73) Assignee: SELEX GALILEO INC., Arlington, VA (US)

( * ) Notice: Subject to any disclaimer, the term of this patent is extended or adjusted under 35 U.S.C. 154(b) by 89 days.

(21) Appl. No.: 15/167,854

(22) Filed: May 27, 2016

(65) Prior Publication Data

US 2017/0347058 A1    Nov. 30, 2017

(51) Int. Cl.
| | |
|---|---|
| H04N 7/18 | (2006.01) |
| H04B 10/50 | (2013.01) |
| H04B 7/185 | (2006.01) |
| H04L 29/12 | (2006.01) |
| H04N 5/232 | (2006.01) |
| H04N 5/913 | (2006.01) |

(52) U.S. Cl.
CPC ......... *H04N 5/913* (2013.01); *H04B 7/18506* (2013.01); *H04B 10/503* (2013.01); *H04L 61/2007* (2013.01); *H04N 5/23203* (2013.01); *H04N 5/23229* (2013.01); *H04N 7/185* (2013.01); *H04N 2005/91357* (2013.01)

(58) Field of Classification Search
None
See application file for complete search history.

(56) References Cited

U.S. PATENT DOCUMENTS

| | | | |
|---|---|---|---|
| 6,985,212 B2 | 1/2006 | Jamieson et al. | 356/5.01 |
| 2003/0042303 A1* | 3/2003 | Tsikos | G06K 7/10594 235/384 |
| 2006/0127097 A1 | 6/2006 | Obrea et al. | 398/115 |
| 2006/0244826 A1* | 11/2006 | Chew | G01S 3/7865 348/143 |
| 2008/0020354 A1* | 1/2008 | Goree | F41A 17/06 434/11 |
| 2012/0218412 A1* | 8/2012 | Dellantoni | G01C 21/3602 348/148 |
| 2013/0105670 A1 | 5/2013 | Borosak | 250/214.1 |
| 2014/0009749 A1* | 1/2014 | Heine | G01B 11/14 356/5.01 |
| 2014/0058667 A1* | 2/2014 | Schuh | G01S 17/42 701/514 |

(Continued)

OTHER PUBLICATIONS

Butzke et al., "The University of Pennsylvania MAGIC 2010 Multi-Robot Unmanned Vehicle System," Journal of Field Robotics, 2012 (18 pgs).

(Continued)

*Primary Examiner* — Kate H Luo
(74) *Attorney, Agent, or Firm* — Hayes Soloway P.C.

(57) ABSTRACT

Systems and methods for preventing image capture and exploitation by optically transmitting a disruptive effect to a digital imaging system. The disruptive effect interferes with the algorithms used to compress and analyze digital images and can be used to disable the imaging equipment or inject foreign code into the imaging system or image processing computer.

21 Claims, 5 Drawing Sheets

(56) References Cited

U.S. PATENT DOCUMENTS

| | | | |
|---|---|---|---|
| 2014/0176954 A1* | 6/2014 | Scott | F41H 3/00 |
| | | | 356/445 |
| 2014/0289794 A1* | 9/2014 | Raleigh | H04L 63/20 |
| | | | 726/1 |
| 2015/0207964 A1 | 7/2015 | Bye et al. | H04N 5/2251 |
| 2015/0246727 A1* | 9/2015 | Masticola | B64C 39/024 |
| | | | 701/2 |
| 2016/0182891 A1* | 6/2016 | Ko | H04N 13/296 |
| | | | 348/47 |
| 2016/0349746 A1* | 12/2016 | Grau | G05D 1/0094 |

OTHER PUBLICATIONS

Constantin, L. "Utterly crazy hack uses long-distance lasers to send malware commands via all-in-one printers," Oct. 16, 2014, retrieved from http://www.pcworld.com/article/2834972/allinone-printers-can-be-used-to-control-infected-airgapped-systems-from-far-away.html (4 pgs).

International Search Report and Written Opinion issued in application No. PCT/US17/21925, dated Jun. 2, 2017 (10 pgs).

International Preliminary Report on Patentability issued in application No. PCT/US2017/021925, dated Dec. 6, 2018 (8 pgs).

* cited by examiner

SYSTEM AND METHOD FOR OPTICAL AND LASER-BASED COUNTER INTELLIGENCE, SURVEILLANCE, AND RECONNAISSANCE

FIELD OF THE DISCLOSURE

The present disclosure is generally related to counter-intelligence, surveillance, and reconnaissance and more particularly is related to a system and method for optical and laser-based counter-intelligence, surveillance, and reconnaissance.

BACKGROUND OF THE DISCLOSURE

Digital imaging sensors such as charge coupled devices (CCDs) are now the predominant technology used to capture both still and moving images. Digital imaging sensors are embedded in mobile telephones, digital cameras and closed circuit television (CCTV) systems. Digital imaging sensors use individual photosensor elements in an array or matrix. Each element of the array is known as a pixel. Each pixel is a sample of an original image; more samples typically provide more accurate representations of the original. The total number of pixels in an image is often referred to as the resolution of the image. High resolution images and videos are typically compressed using algorithms to reduce the amount of data memory needed to store the images. The compression algorithms are used either as the raw image data is acquired or after the raw image data is downloaded to a computer for processing. Compression algorithms reduce the amount of memory required to store an image by reducing redundancy in the image. Very complex still images with a great deal of pixel to pixel diversity, and rapidly varying video signals where the image changes greatly from frame to frame, cannot be efficiently compressed.

The ubiquitous nature of digital imaging equipment makes it possible for images to be taken intentionally or inadvertently in locations where there is a desire to restrict or prohibit the recording of such images. This is especially true now that digital imaging equipment is often used in conjunction with unmanned vehicles that may be autonomous or controlled by an operator from a remote position. While unmanned vehicles have been used in military environments for some time, they are becoming increasingly available to the public. It is now common for hobbyists and flying enthusiasts to use unmanned vehicles for aerial photography and many other recreational purposes. Such technology has even become a common sight in toy aisles of many stores. These unmanned vehicles have also begun to appear over sports stadiums, national infrastructure sites and military installations within the United States which leaves these sites susceptible to unwanted surveillance by unknown parties.

Thus, a heretofore unaddressed need exists in the industry to prevent the capture and exploitation of sensitive images using digital imaging equipment.

SUMMARY OF THE DISCLOSURE

Embodiments of the present disclosure provide a system and method for delivering a disruptive effect to digital imaging equipment. An optical transmission system can be used to increase the image complexity being detected by the camera and cause image compression algorithms used on the acquired images to fail or be compromised. The disruptive effect can be generated by either producing a light pattern at the image plane of the digital imaging equipment (spatial modulation) or by rapidly varying the intensity at the image plane (temporal modulation). The image complexity introduced by the optical transmission system can be tailored to cause one of several effects:

1) The acquired image can be made incapable of compression by the built-in compression algorithms used in the camera. This can result in a buffer overload that causes the imaging equipment to stop functioning.

2) The image complexity can be tailored to generate a controlled memory overflow that causes firmware in the camera system to be overwritten, allowing foreign code to be injected into the device memory. This code could be used to permanently interfere with the normal operation of the device. As used herein, "foreign code" is intended to comprise any software code that interferes with the normal operation of any imaging device or computer.

3) The image complexity can be tailored such that it is targeted to interfere with the compression or enhancement of any images once they are downloaded from the imaging device.

By way of example, the projection of certain complex images onto the imaging sensor of a digital camera can cause the readout and compression algorithms used by the camera to fail, resulting in the camera ceasing to function. A similar effect can be obtained by rapidly varying the background illumination between and/or within image frames captured by a digital video camera. The rapid changes in background illumination can be obtained by illuminating the image sensor of the camera with a light source such as a laser that is intensity modulated at, around or above the frame refresh rate of the camera. The rapid changes of background illumination cause the video compression codec of the camera to fail and cause a buffer overrun that overwrites memory locations where code responsible for normal operation of the camera is located. This results in the camera ceasing to function properly. With sufficiently precise control of the buffer overload it can be used to inject foreign code into the camera.

In one aspect of the disclosure, there is provided a system for delivering a disruptive effect to imaging equipment, the system comprising:

an optical transmission source capable of remotely introducing sufficient spatial or temporal complexity into an image generated by the above referenced imaging equipment, so as to interfere with the normal processes of image processing or image compression being performed on the image.

In one aspect the optical complexity is generated using the spatial intensity modulation of an optical transmission source.

In another aspect the optical complexity is generated using the temporal intensity modulation of an optical transmission source In still another aspect the image complexity introduced by the system is designed to result in the temporary or permanent impairment of the normal function of the device.

In yet another aspect, the image complexity introduced by the system is intended to cause a memory overflow that injects new or foreign commands into the firmware of the imaging device.

In another aspect the image complexity introduced by the system is designed to interfere with image processing and compression algorithms of images downloaded from the imaging device into a computer.

The image complexity is designed to cause the injection of foreign code into the equipment used for the image compression or processing of images generated by the imaging device.

In another aspect the optical transmission source is a laser.

In yet another aspect the optical transmission source is a Vertical Cavity Surface Emitting Laser (VCSEL) or array of individual VCSEL elements.

In still another aspect the imaging equipment is mounted on an unmanned vehicle. In such aspect the image complexity introduced by the system preferably is designed to interfere with image processing of any viewing apparatus, such as video goggles, that is used by the operator of an unmanned vehicle to control the vehicle.

In another aspect the imaging equipment is mounted on an unmanned aerial system (UAS).

In another aspect the quantity of code is received within the optical processing system without detection by an operator.

In yet another aspect the optical transmission system is positioned in a remote location, a spaced distance from the unmanned vehicle, wherein the spaced distance is less than a distance of a maximum range of the optical imaging system of the unmanned vehicle.

In another aspect the optical transmission system is positioned in a remote location, a spaced distance from the UAS, wherein the spaced distance is less than a distance of a maximum range of the optical imaging system of the UAS.

In still another aspect the optical transmission system is at least partially housed within a surveillance and threat acquisition system having a pan-tilt head. In such aspect the surveillance and threat acquisition system preferably further comprises at least one camera, wherein the camera provides a visual image of the target, and optionally array further comprise a control system controlling the optical transmission system, wherein the visual image of a target is communicated from the camera to the control system. In such aspect the optical signal being transmitted to the optical imaging system of the target preferably is selected based on an identification of the type of optical processing system of the target from its visual image.

The present disclosure also provides system for counter intelligence, surveillance, and reconnaissance (ISR) comprising:

a laser system, wherein the laser system is capable of emitting a laser beam directed to at least one camera mounted on an unmanned vehicle;

a computerized control system in communication with the laser system, wherein a quantity of foreign code transmitted from the memory of the computerized control system to at least one camera with the laser beam, wherein the quantity of foreign code is optically injected into the optical processing system through at least one camera; and at least one computer in communication with the optical processing system, wherein at least a portion of the quantity of foreign code is transmitted to at least one computer.

In such aspect the at least one computer may further comprise a processing, exploitation, dissemination (PED) system.

In another aspect after the portion of the quantity of foreign code is transmitted to at least one computer, the code causes an location ping having an Internet Protocol (IP) address of at least one computer is transmitted over an internet connection.

In yet another aspect the quantity of foreign code prevents an image captured by the at least one camera of the unmanned vehicle from being transmitted to the at least one computer.

In still yet another aspect the quantity of foreign code is received within the optical processing system of the unmanned vehicle without detection by the operator of the unmanned vehicle.

In another aspect the quantity of code is optically injected into the optical processing system through at least one camera of the UAS using temporal intensity modulation of the laser beam.

In another aspect the quantity of code is optically injected into the optical processing system through at least one camera of the UAS using spatial intensity modulation of the laser beam.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals, designate corresponding parts throughout the several views.

DETAILED DESCRIPTION

Figure 1:
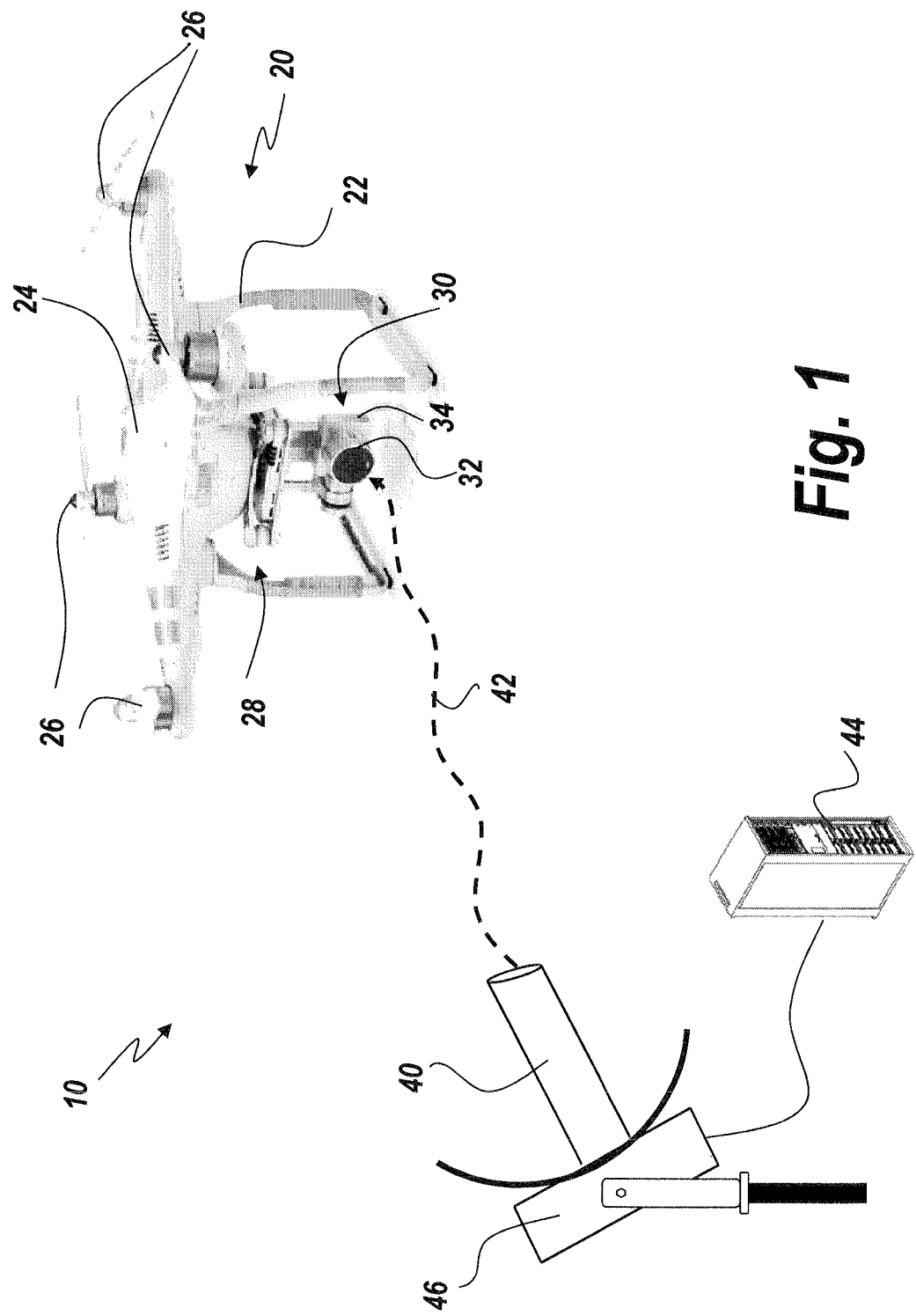
FIG. 1 is a schematic of a system for creating a high diversity image within an imaging system that cannot be compressed by the image compression codecs in the imaging system.

FIG. 1 is a schematic of a system for delivering a disruptive effect to an imaging system in accordance with a first exemplary embodiment of the present disclosure. The system uses a laser source that is capable of being modulated at rates greater than or equal to the frame refresh rate of the imaging system. This type of system can be used to remotely temporarily disable an imaging system or to inject executable code into the systems processor. The effect can be used to disable static imaging equipment, like those commonly used in mast mounted Closed Circuit Television (CCTV) surveillance equipment. It can also be used to disable imaging systems mounted on mobile platforms such as unmanned vehicles.

Within the industry, it is well-known that electronic jamming can be used for countering surveillance using unmanned vehicles such as unmanned ground vehicles (UGVs) or unmanned aerial vehicles (UAVs). However, this type of countermeasure has shortcomings, such as the range at which it may be used, as well as problems caused in unrelated nearby systems produced by the jamming signals.

The subject disclosure provides benefits over conventional systems for this application by using the optical transfer of a signal via a laser into the image processing system of cameras used on unmanned vehicles, which can be used to disable the onboard imaging system, but also to further inject foreign code into the imaging system.

Figure 2:
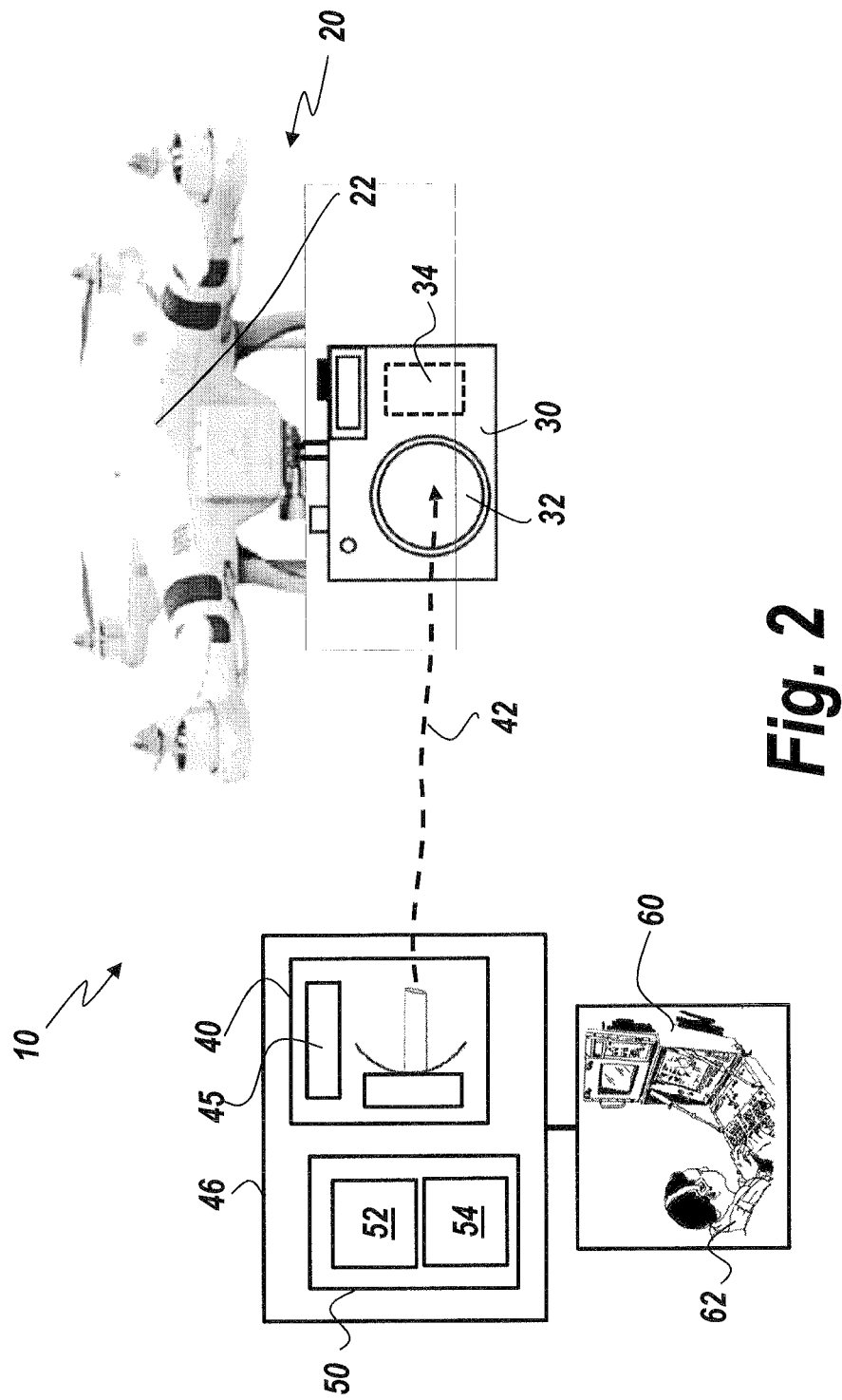
FIG. 2 is a schematic block diagram of the system of FIG. 1, in accordance with the first exemplary embodiment of the present disclosure.

The subject disclosure is described relative to unmanned vehicles which may include different types of autonomous or semi-autonomous ground or aerial vehicles. Generally, unmanned vehicles carry other devices, including surveillance devices such as cameras, weapons, and/or communication devices. Referring also to FIG. 2, the unmanned vehicle is generally identified with reference character 20, where the unmanned vehicle carries a sensor such as a camera 30. While the design of the unmanned vehicle may vary greatly, one common type of unmanned aerial vehicle (UAV) 22 includes a body 24 which has a plurality of rotary blades 26 positioned thereon. On an underside of the body 24 is a payload area 28 which is capable of carrying the camera 30. The camera 30 may be removably affixed to the UAV 22 and a plurality of cameras 30 may also be used with a single UAV 22; the number and type of which is often weight-dependent. The camera 30 includes an optical lens 32 and is in communication with an optical processing system 34: the computer-based processing and/or control system used by the camera 30 to process the images captured by the lens 32. The optical processing system 34 may commonly be housed within the camera 30 itself, but it may also be within the body 24 of the UAV 22 or in another location (in which case imagery captured by the camera 30 is transmitted to the optical processing system 34). In FIG. 1, the optical processing system 34 is depicted positioned within the body of the camera 30.

The system 10 exploits the image processing software of the UAS camera 10 against itself, through the combined application of laser and cyber technology. As shown schematically in FIG. 1, the system 10 includes a laser system 40 which is capable of emitting a laser beam 42 to the image processing system 34 of a UAS camera 20. Specifically, the laser beam 42 is directed to the lens 32 of the camera 30 to inject unexpected complexity into the image being processed by the imaging system 34 of the UAS 20 with the laser beam 42. Injection can be done during the day or night in weather conditions which are favorable to operating a UAS 20. Optically injecting image complexity refers to the function of using the laser beam 42 to transmit an optical pulse train that interacts with the readout mechanisms of the imaging system to create an image that cannot be compressed by the image compression algorithms of the imaging system. The optical pulse train is generated by a computer processor 44 in communication with the laser beam 42, to the lens 32 of the camera 30 where it is received, such that the uncompressible image generated, can be used to cause a buffer overrun in the camera that in turn, causes the camera software to fail or enables code injection into the executable memory of the camera. The injected code may include varieties of programs, codes, scripts, or techniques, such as viruses or other software-based cyber effects, which are capable of interfacing with the existing code used by the optical processing system 34 and exploiting it.

Once the injected foreign code is present within the camera executable memory 34, its function or functions may vary depending on the intended actions of the operator of the laser system 10. For example, in one scenario, the foreign code allows the operator of the system 10 to identify the location of the UAS operator during the processing of the captured imagery.

Other types of malicious code may be used to shut off the camera 30, destroy the optical processing system 34, view any images or other data that have been captured by the camera 30 and are stored in the optical processing system 34, interfere with the operation of viewing goggles that are commonly used to control unmanned vehicles, as well as numerous other functions. FIG. 2 is a schematic block diagram of the system 10 of FIG. 1, in accordance with the first exemplary embodiment of the present disclosure. Relative to FIGS. 1-2, it is noted that the laser system 40 may be incorporated or included with a number of other counter-ISR systems and counter-UAS systems available in the industry. For example, the laser system 40 may be incorporated into a surveillance and threat acquisition system 46 having a pan-tilt head 48 which allows the laser beam 42 to be directable to any location where a UAV 22 is positioned. The counter-UAS system may include a computerized control 60 which allows an operator 62 to control the laser system 40 as well as any other devices of the surveillance and threat acquisition system 46. This type of surveillance and threat acquisition system 46 uses a pan/tilt mechanism to hold a head 50 which can house other optic devices, including an infra red (IR) sensors/camera 52 and/or a daylight camera 54. These units 52, 54 may permit the surveillance and threat acquisition system 46 to precisely aim the laser beam 42 at the unmanned vehicle 22. The system 10 can also be incorporated with systems for the initial detection of the UAS 20, such as a counter-UAS system, which uses a combination of radar and/or electronic surveillance techniques to detect, track, fix and identify the unmanned vehicle 20.

The combined use of the laser system 40 with the surveillance and threat acquisition system 46 allows for the application of laser transmitted disruptive effects to a camera 20 at varied distances. For example, counter UAS systems are designed to detect and track UAS 20 at ranges of 20 km or more such that the UAS 20 can be detected before they are in a location to conduct surveillance or reconnaissance. When the laser system 10 is incorporated into such a Counter-UAS system, the application of the laser system 40 may not be relevant until the UAS 20 is within the maximum range of the camera 30 that the UAS employs. Thus, the two systems combined may allow for the detection, tracking, fixing, and identification of the UAS 20 before it is within optical range of a surveillance target. The UAS 20 is then injected with code once it is within optical range of the surveillance target.

To enable maximum usage of the system 10, it is an objective that the system 10 has appropriate size, weight, and power requirements, such that the system 10 can be light weight and man portable. When the system 10 is combined with surveillance and threat acquisition systems 46, it is possible for the combination to include a plurality of optical heads 50 which are positioned at various degrees to cover a setting. For example, two or three heads 50 may be sufficient to cover large installations such as airports, harbors or military bases.

Figure 3:
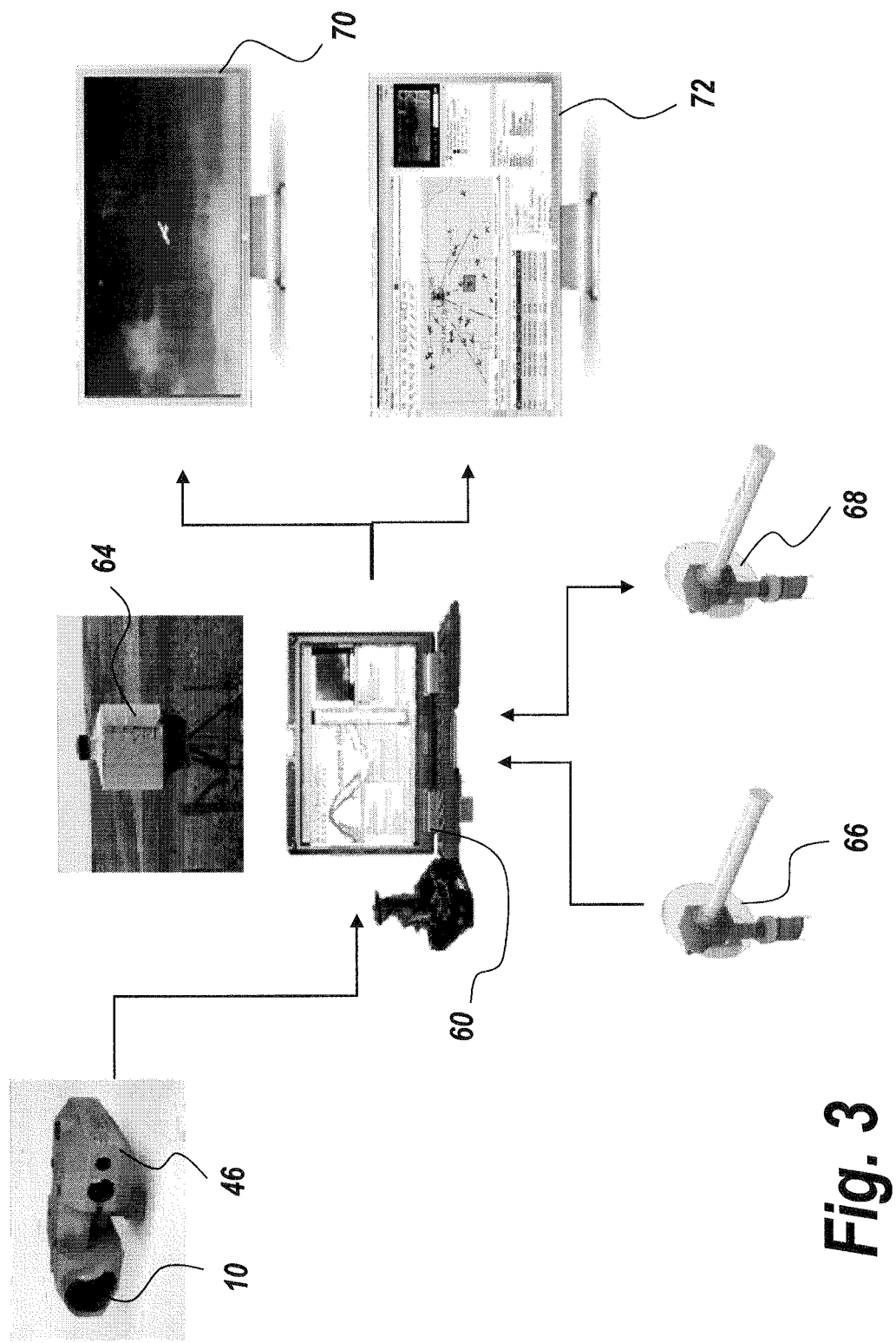
FIG. 3 is a schematic block diagram of the system of FIG. 1 incorporated with a surveillance and threat acquisition system, in accordance with the first exemplary embodiment of the present disclosure.

FIG. 3 is a schematic block diagram of the system 10 of FIG. 1 incorporated with a surveillance and threat acquisition system, in accordance with the first exemplary embodiment of the present disclosure. With reference to FIGS. 2-3, when the system 10 is incorporated with the surveillance and threat acquisition systems 46, it may allow all data to be communicated to the control system 60, such as a vantage C2 terminal. That control system 60 may be in communication with radar systems 64, other electronic surveillance systems 66, and electronic attack devices 68. The control system 60 may also provide for visual display of the surveilled images on a display screen 70 and a vantage control screen 72.

Incorporating the system 10 within the surveillance and threat acquisition systems 46 may provide other benefits, such as obtaining a visual image of the UAS 20. This may allow an operator 62 of the system 10 to identify the type of UAV 22 or the type of camera 30 carried by the UAV. Images of the UAV 22 may be captured by the daylight camera unit 54 and communicated to the control system 60 and the operator 62. For example, the counter-UAS system may employ a camera which will generate imagery of sufficient quality to identify the camera 30 carried by the UAV 22, thereby allowing the operator 62 of the system 10 to refine the optical signal that is emitted by the laser system 40 to better match the camera-resident image processor type. Accordingly, the type of electronic warfare effect or cyber effect may be adjusted for each UAS 20 by selecting a specific type of injected code to be transmitted to the optical processing system 32 of the UAS 20 based on a visual image of the UAS 20.

Figure 4:
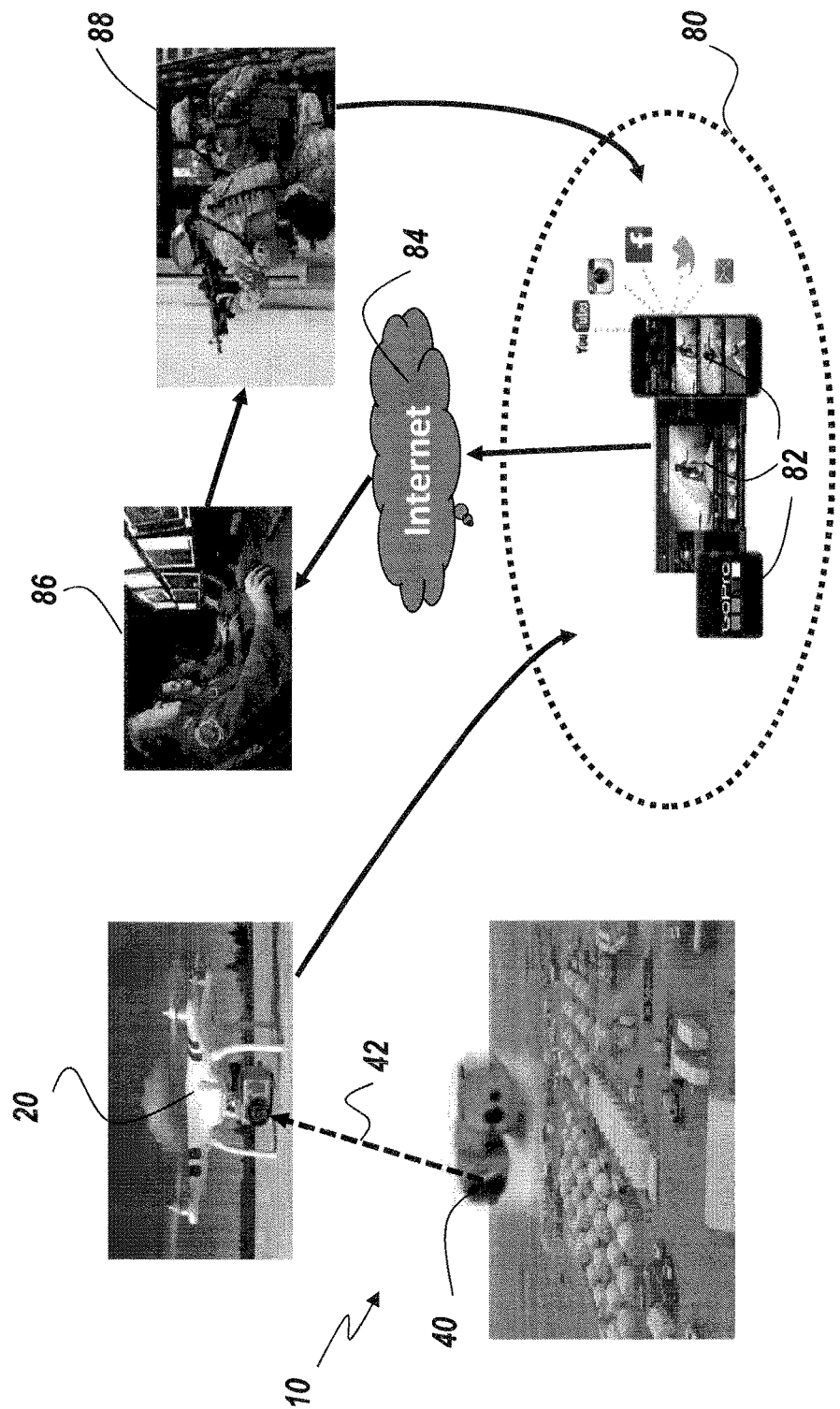
FIG. 4 is an expanded schematic block diagram of the system of FIG. 1, in accordance with the first exemplary embodiment of the present disclosure.

FIG. 4 is an expanded schematic block diagram of the system 10 of FIG. 1, in accordance with the first exemplary embodiment of the present disclosure. While the system 10 thus far has been described as being capable of countering the ISR capabilities of a UAS (with camera) 20, it is noted that the injection of code into the optical processing system of the UAS 20 may be used to facilitate cyber effects against the system being used to process imagery collected by an operator of the UAS 20. In one example, injection of the malicious code with the laser system 40 to the UAS 20 using the laser beam 42 may be completed without detection by a UAS 20 operator. As a result, the operator of the UAS 20 may be entirely unaware of the presence of the malicious code on the UAS optical system 20.

When the UAS 20 completes its mission and returns to its base, the operator of the UAS 20 will attempt to retrieve the data on the optical processing system of the UAS 20 by connecting the camera to a computer or similar device, such as a tablet computer or a phone. Collectively, the computer devices 82 used by the UAS operator may be known as the processing, exploitation, dissemination (PED) system 80. The devices 82 of the PED system 80 may be in communication with other devices through networks such as the internet 84, which allow the injected code to be transmitted throughout the PED system 80 to many of the devices 82 used by the enemy. For example, the embedded injected code within the optical processing system of the UAS camera 20 may be downloaded unknowingly from the camera of the UAS, where the injected code generates a new command set as the imagery data transfers to a device 82 within the PED system 80. The command can be programmed to tag the device 82 and/or simply crash the device 82, among other actions.

One particularly beneficial use of the injected code may be to establish a location ping over the Internet 84 to allow the UAS operators' location to be discovered using their Internet Protocol (IP) address.

Figure 5:
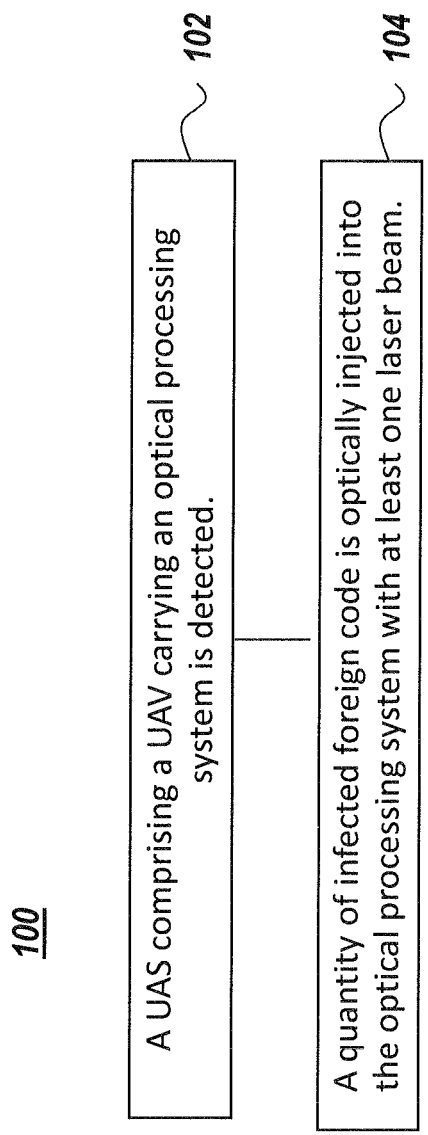
FIG. 5 is a flowchart illustrating a method for counter intelligence, surveillance, and reconnaissance, in accordance with the first exemplary embodiment of the disclosure.

FIG. 5 is a flowchart 100 illustrating a method for counter intelligence, surveillance, and reconnaissance, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. For example, a modulator 42 may be included within the laser system 40 to vary the optical power of the laser beam 42 All such modifications and variations are intended to be included herein within the scope of this disclosure and the present disclosure and protected by the following claims.

What is claimed is:

1. A system for delivering a disruptive effect to imaging equipment comprising:
   imaging equipment, wherein the imaging equipment generates a digital image and includes an optical processing system; and
   an optical transmission source, wherein the optical transmission source remotely introduces optical complexity into the digital image generated by the imaging equipment, wherein the optical complexity is generated using spatial intensity modulation of the optical transmission source, to interfere with at least one normal processes of the imaging equipment, wherein the interference with the at least one normal processes is at least temporary, and wherein the at least one normal process includes at least one of processing the digital image and compressing the digital image, wherein the optical complexity introduced is intended to cause at least one of:
   a memory overflow that injects new or foreign commands into firmware of the imaging equipment; or
   interference with image processing and compression algorithms of images downloaded from the imaging equipment into a computer.

2. The system of claim 1, wherein the optical complexity is generated using temporal intensity modulation of the optical transmission source.

3. The system of claim 2, wherein the optical complexity is designed to cause the injection of foreign code into the imaging equipment used for the image compression or processing of images generated by the imaging equipment.

4. The system of claim 3, wherein a quantity of code is received within the optical processing system without detection by the operator.

5. The system of claim 1, wherein the optical transmission source is a laser.

6. The system of claim 1, wherein the optical transmission source is a Vertical Cavity Surface Emitting Laser (VCSEL) or array of individual VCSEL elements.

7. The system of claim 1, wherein the imaging equipment is mounted on an unmanned vehicle.

8. The system of claim 7, wherein the optical complexity introduced by the optical transmission source is designed to interfere with the image processing of a viewing apparatus that is used by an operator of an unmanned vehicle to control the unmanned vehicle.

9. The system of claim 7, wherein the optical transmission source is positioned in a remote location, a spaced distance from the unmanned vehicle, wherein the spaced distance is less than a distance of a maximum range of the optical imaging equipment of the unmanned vehicle.

10. The system of claim 1, wherein the imaging equipment is mounted on an unmanned aerial system (UAS).

11. The system of claim 10, wherein the optical transmission source is positioned in a remote location, a spaced distance from the UAS, wherein the spaced distance is less than a distance of a maximum range of the imaging equipment of the UAS.

12. The system of claim 1, wherein the optical transmission source is at least partially housed within a surveillance and threat acquisition system having a pan-tilt head.

13. The system of claim 12, wherein the surveillance and threat acquisition system further comprises at least one camera, wherein the camera provides a visual image of a target.

14. The system of claim 13, further comprising a control system controlling the optical transmission source, wherein a visual image of a target is communicated from the at least one camera to the control system.

15. The system of claim 14, wherein an optical signal being transmitted to the imaging equipment of the target is selected based on an identification of the type of imaging equipment of the target from the visual image.

16. A system for counter intelligence, surveillance, and reconnaissance (ISR) comprising:
    a laser system, wherein the laser system is capable of emitting a laser beam directed to at least one camera mounted on an unmanned vehicle;
    a computerized control system in communication with the laser system, wherein the computerized control system optically injects a quantity of foreign code from a memory of the computerized control system to the at least one camera mounted on the unmanned vehicle, wherein the optical complexity is generated using spatial intensity modulation; and
    at least one computer in communication with the laser system, wherein at least a portion of the quantity of foreign code optically injected from the computerized control system into the at least one camera mounted on the unmanned vehicle is transmitted to the at least one computer,
    wherein after the portion of the quantity of foreign code optically injected from the memory of the computerized control system to the at least one camera mounted on the unmanned vehicle is transmitted to the at least one computer, the code causes a location ping having an Internet Protocol (IP) address of at least one computer and is transmitted over an internet connection.

17. The system of claim 16, wherein at least one computer further comprises a processing, exploitation, dissemination (PED) system.

18. The system of claim 16, wherein the quantity of foreign code prevents an image captured by the at least one camera mounted on the unmanned vehicle from being transmitted to the at least one computer.

19. The system of claim 16, wherein the quantity of foreign code is received by the at least one camera mounted on the unmanned vehicle without detection by the operator of the unmanned vehicle.

20. The method of claim 16, wherein the optical complexity is generated using temporal intensity modulation.

21. A system for delivering a disruptive effect to imaging equipment comprising:
    imaging equipment;
    a digital image generated by the imaging equipment;
    an optical processing system within the imaging equipment;
    an optical transmission source located separate from the imaging equipment; and
    optical complexity remotely introduced into the imaging equipment by the optical transmission source, wherein the optical complexity is generated using spatial intensity modulation and temporal intensity modulation, wherein the optical complexity interferes with at least one normal processes of the imaging equipment, wherein the interference with the at least one normal processes is at least temporary, and wherein the at least one normal processes includes at least one of processing the digital image and compressing the digital image, wherein the optical complexity introduced is intended to cause at least one of:
        a memory overflow that injects new or foreign commands into firmware of the imaging equipment; or
        interference with image processing and compression algorithms of images downloaded from the imaging equipment into a computer.

* * * * *